(12) United States Patent
Behan et al.

(10) Patent No.: US 8,497,406 B2
(45) Date of Patent: Jul. 30, 2013

(54) PREPARATION AND CONDITIONING OF SEDIMENTARY MATERIALS

(76) Inventors: Michael J. Behan, Middletown, NJ (US); Mark T. Ungar, Mendham, NJ (US)

( * ) Notice: Subject to any disclaimer, the term of this patent is extended or adjusted under 35 U.S.C. 154(b) by 676 days.

(21) Appl. No.: 12/299,175

(22) PCT Filed: Jun. 21, 2006

(86) PCT No.: PCT/US2006/024071
§ 371 (c)(1),
(2), (4) Date: Jun. 25, 2010

(87) PCT Pub. No.: WO2007/149078
PCT Pub. Date: Dec. 27, 2007

(65) Prior Publication Data
US 2010/0268011 A1 Oct. 21, 2010

(51) Int. Cl.
*A62D 3/38* (2007.01)
*C02F 1/42* (2006.01)
*G21F 9/00* (2006.01)

(52) U.S. Cl.
USPC .... 588/320; 210/673; 405/128.1; 405/128.15

(58) Field of Classification Search
None
See application file for complete search history.

(56) References Cited

U.S. PATENT DOCUMENTS

| | | | |
|---|---|---|---|
| 5,128,068 A * | 7/1992 | Lahoda et al. | 588/1 |
| 5,167,841 A | 12/1992 | Mims | |
| 5,414,195 A * | 5/1995 | Peterson et al. | 588/1 |
| 5,476,994 A * | 12/1995 | Trezek | 588/256 |
| 6,299,380 B1 | 10/2001 | Bracegirdle | |
| 7,255,514 B2 * | 8/2007 | Benjamin et al. | 405/128.75 |
| 2003/0082084 A1 * | 5/2003 | Cort | 423/25 |
| 2003/0121863 A1 * | 7/2003 | Kelly et al. | 210/721 |

OTHER PUBLICATIONS

Semer, Robin et al. "Evaluation of Soil Washing Process to remove mixed Contaminants from a Sandy Loam". Journal of Hazardous Materials. 45-57 (1996).*
International Search Report dated Feb. 2, 2007 from corresponding PCT/US2006/024071.

* cited by examiner

*Primary Examiner* — Melvin C Mayes
*Assistant Examiner* — Sheng H Davis

(57) ABSTRACT

A flexible process for the preparation and conditioning of sedimentary materials. The degree of decontamination of these dredged materials is enhanced by the use of chemical indicators. Based upon the level of contamination contained within this material the process is used to isolate the specific contamination and utilize a variable process to decontaminate these compounds. Not all of the compounds contained within the dredged sediment is treated the same way. The process is designed to isolate the composite of materials and treat each particle with a different process based upon its classification. Post treatment, this material may be combined and dewatered for a suitable use.

3 Claims, 3 Drawing Sheets

PREPARATION AND CONDITIONING OF SEDIMENTARY MATERIALS

FIELD OF THE INVENTION

The invention relates to a process for conditioning dredged material to isolate and condition the embodied contaminated materials to meet threshold limits for beneficial use, geotechnical and landfill requirements.

BACKGROUND OF THE INVENTION

Contaminated materials are concentrated in sedimentary materials. Contaminated materials have been depositing in lakes and rivers over the past several decades. Various alternative solutions have been developed by those skilled in the art to manage this problem. The issue is driven by the utmost concern for the environment coupled with the need to keep water traffic channels clear. The simplest method involves removal of the contaminated material and depositing it elsewhere in other permissible places. This method of hazardous waste disposal has been challenged as both environmentally detrimental and extremely expensive.

Some currently used process technologies utilize some form of both mechanical and chemical means to treat the contaminated material. Other methods are prohibitively large and expensive in that they require processing of large quantities of treated materials. One such method is thermal desorption. Thermal desorption results in emission of contaminants into the atmosphere. Emission of volatile organic compounds (VOCs) is highly regulated. This technique is expensive and requires the use of scrubbers and distillers to lower the levels of VOCs released to the atmosphere. Another drawback of thermal desorption is the requirement of a substantial amount of energy. Accordingly, there is a need for an economic means for preparation and conditioning of dredged material. There is also a need for a method of conditioning dredged material which can convert it into an environmentally safe beneficial end product and recover process water therefrom.

SUMMARY OF THE INVENTION

It is an object of the present invention to provide an economical and variable process for conditioning dredged material into a beneficial end use product. Based upon the level of contamination contained within the dredged material, the process isolates the specific contamination and utilizes a variable process which separates the particles into a particle size range and conditions each sequentially smaller particle with a different treatment to decontaminate these compounds.

The process of the present invention overcomes some of the difficulties of the past in that it comprises laboratory analysis to isolate and treat only specifically targeted contaminated materials contained within the dredged material.

It is an object of the present invention to provide a process for conditioning dredged material by isolating the composite of materials and treating each particle with a different process based on its classification.

It is also an object of the present invention to have a level of treatment of dredged material contingent on particle sizes, specific contaminated particles, and results desired.

It is another object of the present invention to provide a process for conditioning dredged material that reduces the volume of treated materials, and concentrates mainly on the contaminated particles thereby reducing the total cost of operations.

It is yet another object of the present invention to combine and dewater the post-treatment decontaminated dredge material for a suitable use or to meet geotechnical or landfill requirements.

These and other objects of the invention are obtained by a method for treating dredged material comprising removing particles larger than ¼ inch, conditioning the particles; using indicators to determine decontamination effectiveness; allowing for exposure changes relevant to contact times; adding chemicals to derive a beneficial end use product based on concentration of target contamination levels; using additives to obtain geotechnical stabilization and accomplishing treatment goals without the use of excessive energy.

The method for preparation and conditioning of sedimentary materials of the present invention provides an effective, energy-efficient, cost-effective method for achieving all the enumerated objectives, solves problems and obtains new results in the art.

DETAILED DESCRIPTION OF THE INVENTION

The present invention describes a variable process that combines various treatments based on particle size, specific contaminated particles and results desired that conditions dredged materials into a beneficial end use product.

Figure 2:
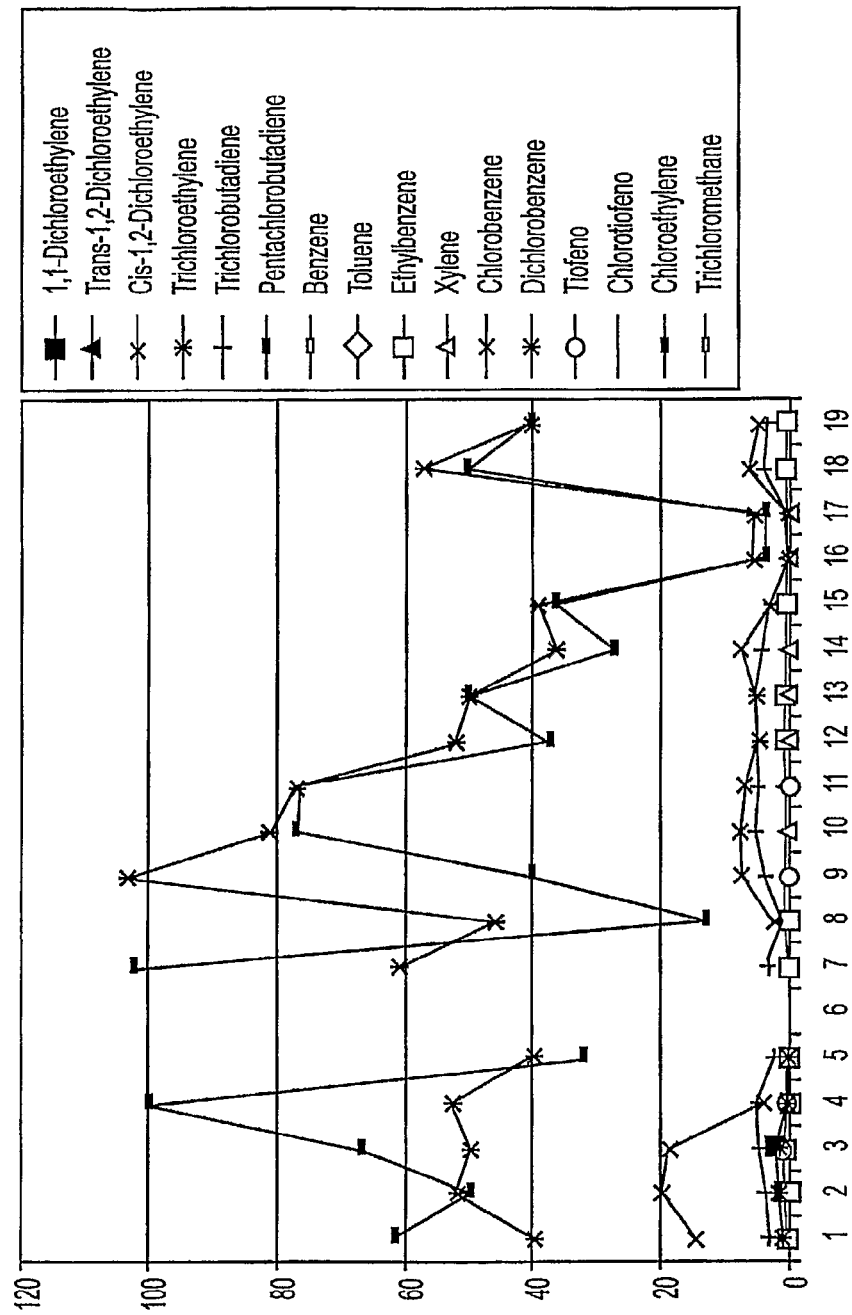
FIG. 2 is a graph showing an example of the types and levels of compounds contained in the dredged material and potential levels of decontamination by other methods.
Figure 3:
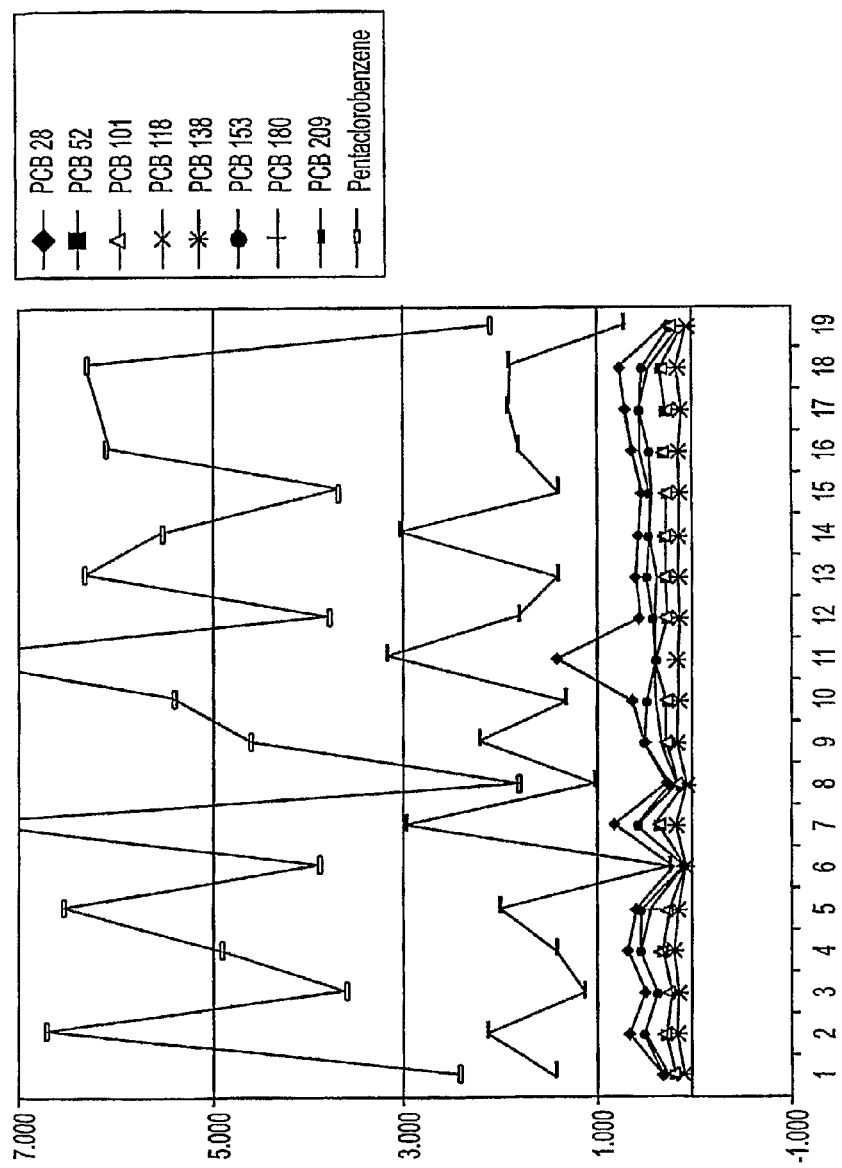
FIG. 3 is a graph further showing an example of the types and levels of compounds contained in the dredged material continued from FIG. 2 and potential levels of decontamination by other methods.

Core sampling of the target areas is performed together with a three-dimensional (3-D) model of the site. In accordance with the invention, laboratory analysis work is performed to determine the types of compounds contained in areas to be dredged. FIGS. 2 and 3 reveal the types and levels of compounds contained in an example of dredged material. The figures reveal the level and variety of PCBs and other chemical contaminants found. Referring to FIG. 2, 19 different dredged samples were analyzed to show the amount and type of contamination in ppm contained therein. The results provide a baseline and reveal the varying degree of contamination in dredged material. Referring to FIG. 3, additional results from the 19 samples of FIG. 2 reveal the amount of PCBs.

Next, a controlled dredging process removes the underwater soils based upon the 3-D model. Dredging may be performed by any means known to those skilled in the art, such as suction, hydraulic dredging or mechanical dredging. Further, the dredging can be performed on any suitable body of water. The material is then transported to the erected processing site for conditioning.

The dredged material is then processed using an appropriate portion of the process and sorted. Depending on the type of material or contaminants, different parts of the process for treatment are utilized. Most of the mass of the material will not contain any types of contamination. This material is sorted and immediately removed. The remaining compounds are conditioned for treatment.

Most of the naturally occurring organic matter (NOM) is removed by known treatment methods. The initial sorting phase removes organic materials that are large in size. The NOM is then treated by halogen addition, i.e. chlorination.

As used herein, the term "naturally occurring matter" includes, but is not limited to organic compounds such as aliphatic, aromatic, and heteroaromatic hydrocarbons, dyes, agricultural waste, food waste, and other organic foulants. Charged organic materials may also be removed.

As used herein, the term "particle" refers to any small piece of solid material.

As used herein the term "sedimentary material" refers to a soil, sand mineral or organic material deposit at the bottom of a body of water such as a harbor, river, port, coastal region, pond, or pool.

As used herein the term "sludge" refers to a material that contains at least 10% water by weight.

The term "geostabilization" as used herein refers to the conversion of contaminants such as organic matter into inert material.

The remaining material continues to be sorted based upon particle size with the understanding that the most highly contaminated particles are in the smallest particle size range. Indicating methods are then introduced into the process to determine the level of treatment required. Indicating methods are also used to determine how much time is required for each treatment method to achieve the desired decontamination level based upon the stability of each compound(s) and intermediates formed during the process. Bench testing and scale up to the treatment volume is then performed.

After treatment, this material is combined. Dewatering equipment is then used to reduce the amount of water. Dewatering can be achieved by any method or means known to those skilled in the art. The final step includes addition of other additives to provide the desired geotechnical stability required for the end use product.

As used herein, the term "dewatering" refers to removal of at least some water from dredged material or sludge.

Figure 1:
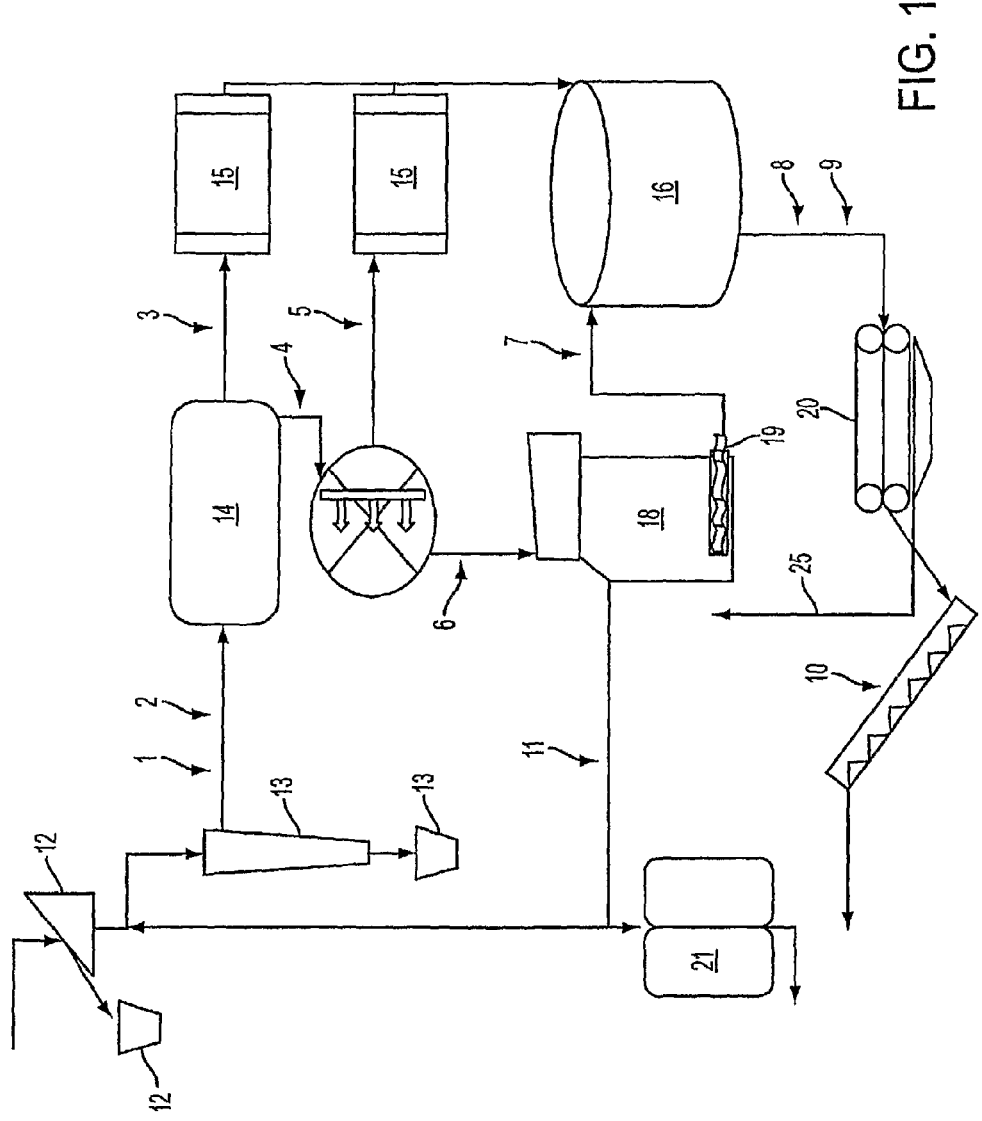
FIG. 1 is a schematic representation illustrating an embodiment of the conditioning process of the present invention.

FIG. 1 is a schematic showing locations of the addition points of the various chemical treatments used throughout the process in tandem with methods used to isolate each of the compounds into various particle sizes. After each mechanical separation phase, FIG. 1 details the process for various contaminant compounds. Each of these feed points also represents the point where a chemical indicator is utilized to achieve the desired results.

FIG. 1 also illustrates the extent of conditioning each of the compounds undergoes. The level of treatment of the contamination is determined by laboratory analysis of each of the indicators used. The degree of flexibility of the process is also shown by this drawing as it reveals how mechanical equipment is utilized to separate the dredged materials into particle size ranges. Separation techniques are introduced to achieve the desired degree of separation.

FIG. 1 reveals the types of chemical(s) added and the anticipated endpoint measured to achieve the expected results. Chemical addition rates are variable and require monitoring. The choice of added chemicals and the levels of amounts added depends upon the initial site conditions and the contaminants found therein. The chemicals added are those known to those skilled in the art and conventionally employed in the art to achieve the desired results. Examples of chemicals include, but are not limited to, flocculating agents, polyelectrolytes, oxidizing agents, agents to control pH, indicators, surfactants, and agents to provide geotechnical stability.

It is understood that the chemicals to be added to the process of the present invention are contingent upon the desired results as well as the physicochemical compatibility of the various chemicals. Chemicals utilized and compatibilities of the various chemicals are known to those skilled in the art. As an example, chemicals to raise pH are well known in the art. As another example, if NaOH is chosen to be the chemical to raise pH, hydrogen peroxide may not be used post NaOH addition as the oxidizer because of resulting chemical incompatibility.

The chemical addition is also dependent upon a number of other factors such as, but not limited to, chemical reaction, reaction sequence, rate of reaction, concentrations used, and conditions utilized. As an example, if sodium bisulfate is added as the reducing agent and chlorine is added as the NOM oxidizer, to produce an effect, the residual sulfite demand will need to be overcome prior to chlorine addition. Likewise if chlorine is fed to a free residual, then hydrogen peroxide addition will require monitoring as the peroxide also acts as a chlorine scavenger in the system. Chlorine demand and formation of hydrochlorous acid (HOCl) with addition of peroxide is a rapid reaction compared to the much slower oxidation of contaminated materials.

Most of the technologies described herein are known to those skilled in the art. It is understood that other technologies to condition dredged material may be used. The process of the present invention allows for flexibility in handling varying contamination levels. The utilization of laboratory analysis and process indicators reveals the level of decontamination of the various constituents. Each of the particles contained within the sedimentation of underwater bodies needs to be managed and the process of the present invention addresses the variability. The process is accomplished by separation of the particles into a particle size range and conditioning each sequentially smaller particle with a different treatment.

As sediment particle size decreases, the surface area per unit mass of sediment increases. Chemical contaminants in sediments are associated primarily with the fine-grained fraction of sediments.

The amount of treatment required is based upon laboratory analysis using known indicators. In one aspect of the present invention exposure of the conditioned particles to the treatment chemistries is prolonged to obtain the desired results. This involves creation of an environment conducive to increasing passive contact times of the oxidation chemistries without the use of excessive force. The final step in the process of the present invention involves dewatering after mixing of the treated materials to produce a suitable end product based upon the ultimate use.

Examples of contamination found in dredged materials includes: polychlorinated biphenyls (PCBs), pesticides, herbicides, insecticides such as dichlorodiphenyltrichloroethane (DDTs), dichloroethylene, benzene, xylene, toluene, and other forms of carbon based aromatic pollutants and petroleum-based byproducts. The degree of decontamination is based upon the degree of exposure to an oxidative environment. The process of the invention achieves up to about 99% reduction in level of contamination for some contaminants.

Another feature in the process of the present invention is dwell time. As used herein, dwell time is defined the time of exposure and the contact time. Separating the compounds into smaller particle size with processing equipment, increases direct contact time with the surface of these contaminants. This allows for full exposure and formation of chemical intermediates.

Chemical addition of oxidative chemistries is known to those skilled in the art. The in-situ process, for example, uses technology for the elimination of subsurface contamination, especially treatment of silt and underground water sources. This technique is utilized above ground only with the assistance of mechanical separation. In lieu of energy that has also been utilized to enhance exposure of the oxidative environment, the present invention utilizes various conditioning techniques to create a suitable environment to achieve the desired results.

Because of the flexibility of the process of the present invention, higher or lower levels of decontamination are possible depending upon the decontamination level needed for the desired end use. Higher treatment either via the use of more chemical treatment or greater contact times can be used to reduce the level of decontamination to very low levels. Alternatively, less treatment can be applied if the permissible levels for the beneficial end use products allow. Thus, the process allows for cost control based upon the degree of decontamination required.

Treatment chemicals are added to the process to perform specific tasks. Some of the chemicals are used to reduce the amounts of NOM in the dredged material. This reduces the amounts of oxidation chemicals needed to form intermediates with the contaminated substances. NOM will react very quickly when oxidants are added, thus reducing the BOD (Biological Oxygen demand) levels. As an example, a very reactive oxidant like chlorine may be used to oxidize biological microorganisms. When the amount of chlorine that is added to a system exceeds the system demand, a "free" residual of chlorine can be detected using equipment such as a Hach DR2000 spectrophotometer. Free residual means all of the NOM in the system has been consumed, and the non-selective addition of other oxidants will contact the other contaminated slower to react organic compounds forming intermediates.

Suitable indicators utilized in FIG. 1 include, but are not limited to:

Chlorine residuals to detect the free and total amount of chlorine.
Sulfite residual to determine part per million of sulfite (reducing agent) that has been added to the system.
Chemical Oxygen Demand (COD) which indicates the oxygen demand volume of a system.
Total Organic Carbon (TOC) which helps determine how much organic based compounds are contained with a sample.
Dissolved Organic Carbon (DOC) which reveals the organics in solution.
Peroxide residual testing that reveals the amount of peroxide consumed.
Permanganate residual testing which also indicates the amount of permanganate found in a sample.
Oxidation Reduction Potential (ORP) testing which indicates whether or not a sample has been reduced, or obtained an oxidative environment.
pH testing These indicators are used to monitor the process and identify the specific amounts of conditioning of each of the particle size ranges. Some of these indicators are required to ensure that the conditioning takes place in the right environment to allow for proper decontamination. Other indicators are used to ensure that the addition of one of the process chemistries will be used to dampen the effect of some of the other process chemistries. It is understood that this is a non-inclusive list as other techniques can be used to achieve the relevant information required.

Chemical indicators are incorporated into the process as a means for determining the "decontamination demand" of the system. Indicators are necessary in the process to reveal the residual amount of tracer chemicals found at various points in the process. Detection of a trace amount of indicator reveals the amount of treatment chemical remaining and are important determinants of the flexibility and variability of the process of the invention.

In another embodiment, physicochemical treatment may be combined or substituted for chemical treatment to remove contaminants.

Detailed Steps of the Preferred Embodiment

The conditioning process involves the steps of: performing a 3-D site survey to determine the types of contamination involved; obtaining raw material from the area of interest by dredging techniques; delivering the dredged material to the process with initial understanding of the types of contamination anticipated to be contained within this material as obtained by the initial 3-D site survey; depositing the dredged material into a coarse filtration screen (12) to remove debris greater than ¼ inch in size; diluting the remaining material with recycled process water; and removing sand, gravel and organic materials that do not need to be handled and are typically removed during the dredging process. Removal of the sand, gravel and organic materials may be effected by a cyclone cleaner (13). The effluent from the filtration screen (12) is passed through sand filters (21) to reduce suspended solids and to meet applicable water discharge specifications.

The remaining material is a smaller mass compared to the original weight of material introduced into the system. The typical mass reduction is 90% or greater. This initial sorting process leads to isolation of target contaminants for further conditioning and destabilization. This sorting process specifically focuses on constituents contained within the dredged material that need to be impacted by further processing techniques, not the bulk of the mass.

The process of the present invention is directed to isolation and a combination of decontamination techniques. In addition, the process addresses the variability of the types of target compounds with the flexibility of the process. The remaining approximately 10% of contaminants is carried through to the next phase in the process where industrial separation equipment is used.

In one embodiment, chlorine dioxide (1) is used as an oxidizing agent to reduce the chemical oxygen demand of the system and a surfactant (2) prepares the remaining particles and facilitates separation by reducing the surface tension and the release of surface embodiments. Chlorine reduces the levels of NOM in water based effluent waste treatment facilities. Alternatively, other useful oxidizing agents known in the art may be used.

Referring to FIG. 1, the next phase of the process is mechanical separation. A device such as, but not limited to, a drum washer (14) can be used to isolate the silt material into even smaller particles. Accepted particles are sent to the next device used for mechanical separation. Rejected particles not small enough to pass through the initial process are pumped into a Baker tank (5) (15) with hydrogen peroxide (3) (5) addition. Drum washers (15) dewater this material which increases the consistency sent to the next step in the process.

The Total Organic Carbon (TOC) and Chemical Oxygen Demand (COD) are measured at this point as indicators of the amount of oxidant required to reduce the amount of contamination contained within this material. This analysis is repeated on the discharge side of the Baker tank (15). If the amount of contamination remains too high adjustments are made: the throughput through the Baker tank (15) may be reduced, or the amount of oxidant added or the dwell time may be increased.

The Baker tank (15) has a series of internal baffles and channels that are utilized to change the dwell time within this vessel. Time plays an important role in the process as defined by the performance indicators. Particle size also plays a role in the treatment of materials within the Baker tanks (15). This material will be in a particle range that is 100 microns or larger. It has been found that this material, once it has been cleansed, will contain only trace amounts of targeted compounds that require further conditioning. The peroxide and dwell time will ensure that this trace amount will have ample contact time with an oxidizer to meet threshold limits at this step in the process. The anticipated mass that will be separated for treatment in this manner ranges from about 5% to about 8% of the original mass processed.

The filtered water from off of the drum water will go through one more separation step to obtain particles that are typically 60 microns or less. Once again, rejected particles expected to represent about 2% to about 4% of the total mass are sent to another Baker tank (15) for treatment as described in the previous step of the process. In addition, at this point, the process pH can be chemically increased with the addition of sodium hydroxide (NaOH) (4) or potassium hydroxide (KOH). Any useful alkalizing agent may be used. Some compounds (e.g. DDTs) have been known to destabilize more readily in an alkaline environment. The addition of these chemicals also assists in the oxidation of other known compounds that can be stabilized with the use of oxidation chemistries. Industrial separation equipment such as a fractionation filter or a centrifuge (not shown) can be selected during this step in the process. This step will also serve to dewater the rejected materials entering the Baker tank (15) to a known consistency.

The remaining 1-2% of the filtered water will contain particles in the size range of 60 microns or less. This is the critical size of particles that will require the most amount of treatment. Those skilled in the art of decontaminating particles in this size range have derived the most efficient treatment ratios of oxidation chemicals required to decontaminate these particles. In a preferred embodiment sodium permanganate (6) or potassium permanganate is used in this step. In other embodiments, alternative suitable oxidizing agents which include, but are not limited to, peroxide, hypochlorite salts, ozone, ultraviolet (UV) light and combinations thereof, may be used. However, any oxidizing agent or treatment known in the art for in-situ treatment of underground contamination in this industry may be used. These chemicals will also treat the filtered water that contains soluble contaminants. Oxidizing agents aid in the formation of large filterable particles suitable for filtration. Suitable oxidizing agents include, but are not limited to, those chosen from the group formed by oxygen, oxygenated derivatives, such as hydrogen peroxide or ozone, chlorine, chlorinated derivatives, such as chlorine dioxide, sodium hypochlorite, calcium hypochlorite, sodium chlorate or bleach, or potassium permanganate.

Indicators will then again determine the effectiveness of chemical treatment. As the chemicals begin to form chemical intermediates, the amount of treatment that needs to take place can be determined by once again using COD, and residual indicators. Preferred indicators are permanganates. If insufficient treatment is found, additional chemicals can be added to achieve the desired results. These parameters are known to the skilled artisan, who will appreciate various alternative chemical treatments in combination with the materials and methods of the invention as described herein.

The balance of the small particles targeted for treatment along with the majority of dilution water (11) will then be sent to the sludge tower (18). The sludge tower (18) will allow for the natural separation of the destabilized intermediates from the water. Precipitates will form creating "treated" sludge which settles to the bottom of the tower. A screw auger (19) at the bottom removes the treated compounds. It is understood that any type of auger, gimlet or wimble known in the art may be used. The remaining water can then be recycled back into the process or purged from the system and filtered through a sand filter back to the body of water.

Both the water in the sludge tank or the treated sludge removed from the bottom by the auger need to be buffered if the process pH was elevated as part of the conditioning. A suitable buffering agent for pH control is sulfuric acid (11). This enables the pH to be buffered back to neutral. Alum (7) will also serve as a processing aid to separate the water from the suspended solids by charge neutralization.

As shown in FIG. 1, in the next step in the process, all of the treated solids are fed into a mix tank (16). The treated particles are combined in the mix tank. A reductive agent such as bisulfate (8) can be added to the mix tank to scavenge any of the residual oxidation chemicals that might still be present in the process. Suitable reductive agents include, but are not limited to, sodium busulfite and sodium borohydride.

The remaining material is again dewatered to achieve a higher level of solids in the finished product. This is accomplished by the addition of a flocculent (9) which flocculates small solid particles into larger particles to increase the settling rate. The amount of flocculent (9) added to the sediment in the mixing tank is dependent upon the sediment flow rates and the type and amount of solids present. A preferred flocculent (9) is a polyacrylic polymer. Suitable polyacrylic polymers may be cationic, anionic, nonionic or mixtures thereof. Examples include, but are not limited to, polyaminoacrylates, polyaminomethacrylates, and polymethylacrylamides. However, other flocculants such as organic and inorganic chemical coagulants may be used. Examples include, but are not limited to, ferric sulfate, ferrous sulfate, aluminum sulfate, epichlorohydrin-dimethylamines (EPI-DMA's), and natural guar. Other representative flocculants include, but are not limited to, water-soluble polymeric flocculating agents. It is understood that while polymeric flocculants are preferred, most preferably polyacrylic polymer flocculants, any flocculent known to those skilled in the art may be used.

The sediment is pumped into a belt press (20) for final dewatering resulting in a filtrate and filter cake. Alternatively, a filter press or centrifuge may be used for dewatering. The filtrate produced is then recycled back to the process sludge tower (25) or used as dilution water. Filter cake produced during the mechanical dewatering operation is about 55% by weight of solids or greater. The filter cake is transported to a pug mill (10) for the final stage of the process. The pug mill is used for continuous mixing, or pugging of the materials.

The filter cake is blended with other additives such as, but not limited to, fly ash and cement, to produce a beneficial use product. Dredged material can be used to benefit and restore the environment. This final product will be loaded onto railcars or trucks and delivered to the suited waste disposal facility as defined by the end use parameters. Examples of beneficial uses include creation of aquatic and wildlife habitat, other habitat enhancement, replenishment of beaches, paving material and landfill cover.

The process of the present invention may be validated by bench scale testing using laboratory equipment.

The present process is further illustrated by the following examples.

EXAMPLES

The following examples are offered to further illustrate the present invention. These examples are intended to be purely exemplary and should not be viewed as a limitation on any claimed embodiment.

The types and levels of contaminants were initially identified and analyzed for the dredged sample. The results of the sample taken are reported below in Table 1 which shows the improvement after treatment vs. untreated for both solids and liquids using two different processes. The sample in Process 1 was treated using the process of FIG. 1 in a neutral pH. Process 1 results are shown in Table 1 below. The sample in Process 2 was treated using the process of FIG. 1 at an elevated pH (>12.0). Process 2 results are shown in Table 1.

All of the results achieved levels of contamination that indicate successful conditioning has taken place. The results indicate that using the process of the invention, in both the solid and liquid forms the level of contamination can be reduced by the indicated percentages. For some contaminants reduction of over 99% following treatment was achieved.

The process of the present invention was validated by bench scale testing using laboratory equipment. Samples were taken and analyzed. The validation results as in Table 1 clearly indicate that successful reduction of contaminants within the sedimentary material occurred and conditioning was carried out satisfactorily.

TABLE 1

| Contamination | UNTREATED Average | Combined after treatment Process 1 | | Combined after treatment Process 2 | |
|---|---|---|---|---|---|
| | | Treatment Average | Improvement % (Over untreated) | Treatment Average | Improvement % (Over untreated) |
| Solid | | | | | |
| PCB 28 | 0.512 | 0.1 | 80.47% | 0.055 | 89.26% |
| PCB 52 | 0.222 | 0.07 | 68.47% | 0.035 | 84.23% |
| PCB 101 | 0.242 | 0.04 | 83.47% | 0.025 | 89.67% |
| PCB 118 | 0.19 | 0.02 | 89.47% | 0.01 | 94.74% |
| PCB 138 | 0.128 | 0.04 | 68.75% | 0.025 | 80.47% |
| PCB 153 | 0.414 | 0.03 | 92.75% | 0.015 | 96.38% |
| PCB 180 | 0.388 | 0.02 | 94.85% | 0.015 | 96.13% |
| PCB 209 | 1.6 | 0.19 | 88.13% | 0.08 | 95.00% |
| Pentaclorobenzene | 4.82 | 3.5 | 27.39% | 1.245 | 74.17% |
| a-HCH | 0.01 | 0.01 | 0.00% | 0.01 | 0.00% |
| HCB | 1.636 | 2.2 | −34.47% | 0.665 | 59.35% |
| b-HCH | 0.142 | 0.11 | 22.54% | 0.04 | 71.83% |
| g-HCH | 0.01 | 0.01 | 0.00% | 0.01 | 0.00% |
| d-HCH | 0.01 | 0.01 | 0.00% | 0.01 | 0.00% |
| pp-DDE | 2.46 | 1.1 | 55.28% | 0.505 | 79.47% |
| pp-DDD | 9.2 | 5.8 | 36.96% | 4.05 | 55.98% |
| pp-DDT | 16.6 | 23 | −38.55% | 8.9 | 46.39% |
| 1,1-Dicloroethylene | 1.45 | 0.08 | 94.48% | 0.05 | 96.55% |
| trans-1,2-Dicloroethylene | 4.04 | 0.54 | 86.63% | 0.29 | 92.82% |
| Cis-1,2-Dicloroethylene | 12.24 | 0.785 | 93.59% | 0.45 | 96.36% |
| Tricloroethylene | 47 | 10.85 | 76.91% | 5.45 | 88.40% |
| Tetracloroethylene | 299 | 14.5 | 95.15% | 6.15 | 97.94% |
| Triclorobutadiene | 4.14 | 1.1 | 73.43% | 0.44 | 89.49% |
| Pentaclorobutadiene | 62.2 | 11 | 82.32% | 8.20 | 86.82% |
| Benzene | 0.04 | 0.01 | 75.00% | 0.01 | 75.00% |
| Toluene | 0.046 | 0.05 | −8.70% | 0.01 | 78.26% |
| Ethylbenzene | 0.052 | 0.01 | 80.77% | 0.01 | 80.77% |
| Xylene | 0.148 | 0.03 | 79.73% | 0.02 | 89.86% |
| Clorobenzene | 0.624 | 0.095 | 84.78% | 0.06 | 91.19% |
| Diclorobenzene | 1.92 | 0.925 | 51.82% | 0.61 | 68.23% |
| Tiofeno | 0.346 | 0.025 | 92.77% | 0.01 | 97.11% |
| Clorotiofeno | 0.422 | 0.07 | 83.41% | 0.04 | 91.71% |
| Cloroethylene | 0.396 | 0.025 | 93.69% | 0.02 | 94.95% |
| Tricloromethane | 0.838 | 0.035 | 95.82% | 0.06 | 93.44% |
| Liquid Sample # | | | | | |
| 1,1-Dicloroethylene | 638 | 24 | 96.24% | 13.75 | 97.84% |
| trans-1,2-Dicloroethylene | 2508 | 166.5 | 93.36% | 79.00 | 96.85% |
| Cis-1,2-Dicloroethylene | 20552 | 409 | 98.01% | 213.50 | 98.96% |
| Tricloroethylene | 273200 | 916 | 99.66% | 5650.00 | 97.93% |
| Tetracloroethylene | 24580 | 165.5 | 99.33% | 2906.50 | 88.18% |
| Triclorobutadiene | 754.8 | 191.5 | 74.63% | 83.00 | 89.00% |
| Pentaclorobutadiene | 1153.4 | 1034 | 10.35% | 1524.50 | −32.17% |
| Benzene | 40 | 1.15 | 97.13% | 0.77 | 98.08% |
| Toluene | 23.2 | 18 | 22.41% | 1.90 | 91.81% |
| Etilbenzene | 11.6 | 1.8 | 84.48% | 1.07 | 90.78% |
| Xylene | 32.6 | 5.7 | 82.52% | 3.55 | 89.11% |
| Clorobenzene | 297.2 | 30 | 89.91% | 8.40 | 97.17% |
| Dichlorobenzene | 568.2 | 162 | 71.49% | 101.00 | 82.22% |
| Tiofeno | 421.6 | 13 | 96.92% | 7.10 | 98.32% |
| Clorotiofeno | 313.2 | 25.5 | 91.86% | 13.50 | 95.69% |
| Cloroethylene | 578.4 | 4.35 | 99.25% | 3.15 | 99.46% |
| Tricloromethane | 2601 | 30 | 98.85% | 22.50 | 99.13% |

Referring to FIG. 2, samples 16 and 17 represent potential levels of decontamination by other known methods. Specifically, samples 16 and 17 underwent decontamination via Thermal Desorption. Via this process, the samples were heated for over 1 hour at an elevated temperature. The elevated temperature was higher than the vapor point of most of the contaminants resulting in decontamination by release of the contaminants into the atmosphere. The results of decontamination via thermal desorption as in FIG. 2 compared to the results obtained in the present process as in Table 1 reveal the advantage of using the present process. Additionally, FIG. 3 shows that thermal desorption is incapable of reducing the level of PCBs. The results of the process of the present invention show reduced PCB levels. As can be noted by the results, the present process results in greater PCB decontamination, which in some cases, approaches 100%. Table 1 reveals that the present invention effectively treats a wide range of contaminates. Thus, the present invention achieves a wider range of decontamination and a much better result.

The method of the invention can be carried out in a continuous or batch mode as prescribed by the level of treatment desired, e.g. in a treatment center. This treatment is based upon conditioning and monitoring of the targeted compounds that will be treated. While the invention has been described in reference to preferred illustrative embodiments, modification by the flexibility of this design will be apparent to one skilled in the art upon reference to the specifications. These modifications are intended to be within the scope of the invention.

The process of the present invention may be used as a component of a larger system of decontamination which may include other methods of treating the contaminated materials, e.g. electrolysis or electrochemical activation, or thermochemical decontamination.

It is understood that the wastewater feed of the present invention can be of any nature, including but not limited to, domestic and industrial wastewaters, sludges from the treatment of waters and domestic and industrial wastewaters, spoil or slurries arising from dredging.

Moreover, the description and illustration of the invention is by way of example, and the scope of the invention is not limited to the exact details shown or described.

Clearly, the invention is not restricted to the aforementioned embodiments. Reasonable modifications and variations will be apparent to one skilled in the art and can be made without departing from the spirit and scope expressed.

We claim:

1. A process for destruction of organic contaminants in dredged material for the formulation of a beneficial end product wherein the process is sequentially set forth:
    (a) sorting out particles greater than ¼ inch in size;
    (b) diluting the remaining material with water;
    (c) separating out sand, gravel and non-contaminated organic matter;
    (d) adding a reductive agent to the remaining material;
    (e) separating out particles from the remaining material such that about 10% of the dredged material remains;
    (f) adding an oxidizing agent to the remaining material from step (e);
    (g) adjusting the dwell time and amount of oxidizing agent added on the basis of total organic carbon (TOC) and chemical oxygen demand (COD) to the remaining material;
    (h) separating out particles 60 microns or less from the remaining material;
    (i) adding a reducing agent to the remaining material;
    (j) adding an oxidizing agent to particles 60 microns or less in size in the remaining material;
    (k) adjusting the pH in the remaining material;
    (l) separating out particles 60 microns or less in size from the remaining material;
    (m) adding a reducing agent to the particles from step (l) and dewatering;
    (n) separating the remaining material into:
    (1) filtrate; and
    (2) filter cake,
    wherein said filtrate is recycled to the above process.

2. The method of claim 1 further comprising providing a source of contaminated sediment.

3. The process of claim 1 wherein a site survey is conducted to determine the types of contamination involved.

* * * * *